United States Patent [19]
Yamaguchi

[11] Patent Number: 5,942,833
[45] Date of Patent: Aug. 24, 1999

[54] FLAT CORELESS VIBRATOR MOTOR

[75] Inventor: Tadao Yamaguchi, Isesaki, Japan

[73] Assignee: Tokyo Parts Industrial Co., Ltd., Isesaki, Japan

[21] Appl. No.: 09/162,565

[22] Filed: Sep. 29, 1998

[51] Int. Cl.[6] .................................................. H02K 1/22
[52] U.S. Cl. .............................. 310/268; 310/81; 310/43; 340/407.1; 384/420
[58] Field of Search ............................... 310/268, 43, 81, 310/90; 384/420

[56] References Cited

U.S. PATENT DOCUMENTS

| | | | |
|---|---|---|---|
| 4,864,276 | 9/1989 | Tribbey et al. | 340/407.1 |
| 5,036,239 | 7/1991 | Yamaguchi | 310/268 |
| 5,471,103 | 11/1995 | Fujii | 310/81 |
| 5,682,132 | 10/1997 | Hiroyoshi et al. | 340/407.1 |
| 5,793,133 | 8/1998 | Shiraki et al. | 310/81 |
| 5,818,177 | 10/1998 | Amiet et al. | 318/135 |

*Primary Examiner*—Nestor Ramirez
*Assistant Examiner*—Guillermo Perez
*Attorney, Agent, or Firm*—Kenjiro Hidaka

[57] ABSTRACT

A flat coreless vibrator motor has a case and a flat generally sector-shaped armature rotor. The rotor has a body that comprises a first part made of a first synthetic resin having a density of less than 1.8 and a second part made of a second synthetic resin having a density of greater than 5.0. The first part is disposed generally radially inside of the second part. A plurality of flat armature coils are molded in the first part and arranged at a predetermined pitch angle within an angular range of 180° about the rotating axis of the rotor in non-overlapping relationship with one another. Alternatively, at least a portion of the second part is interposed between a field magnet of the motor and a cylindrical side plate of the case. A third alternative vibrator motor has a washer attached to the case coaxially with the rotating axis, the first part of the body of the rotor has, integrally on its top, circular convexities coaxial with the rotating axis, and the rotor is urged by resilient commutator brushes in a manner that the circular convexities are pressed against an inside surface of the washer.

9 Claims, 8 Drawing Sheets

FLAT CORELESS VIBRATOR MOTOR

BACKGROUND OF THE INVENTION

1. Field of the Invention

This invention relates to a self-vibrating dc-operated flat coreless vibrator motor used for a pocketable wireless silent alerting device. The motor does not have an output shaft or an eccentric external weight, but its flat armature rotor has an eccentric mass distribution for creating vibration.

2. Description of the Prior Art

A Japanese laid-open patent application, Laid-open No. 63-290140, dated Nov. 28, 1988, discloses a flat coreless vibrator motor. In the rotor of this vibrator motor, one of conventional three armature coils, which are normally arranged at a pitch angle of 120°, is eliminated, and only two coils are partially embedded in a wheel-shaped rotor body made of a synthetic resin. The same Japanese patent publication also discloses an embodiment in which a sector-shaped eccentric weight is mounted on an output shaft of a conventional type rotor having three armature coils arranged at a pitch angle of 120°.

U.S. Pat. No. 4,864,276, issued Sep. 5, 1989, discloses a flat coreless vibrator motor that employs a rotor having three armature coils arranged seemingly at an even pitch angle of 120° but one of the three coils is substantially smaller than the other two so that rotor unbalance is effected.

A vibrator motor having an eccentric weight mounted on its rotor shaft requires axially extra dimension and, therefore, the motor can not be designed in a flat profile. The vibrator motor having a circular rotor, in which one of the armature coils is eliminated or minimized, has problems of providing insufficient torque and insufficient weight unbalance, which causes insufficient vibrations.

The present inventor disclosed in U.S. Pat. No. 5,036,239, issued Jul. 30, 1991, a flat coreless vibrator motor that employs a generally sector-shaped rotor having three armature coils arranged in a non-overlapping manner at an equal pitch angle between 70° and 80°. The coils are molded in a rotor body made of a synthetic resin.

FIG. 8 is a plan view of a rotor employed in a prior-known flat coreless vibrator motor. In FIG. 8, a flat generally sector-shaped coreless rotor R4 has a shaft 41, a brass-made toroidal center holder 42, fixedly mounted on the shaft 41, a body 43 made of a synthetic resin fixedly attached to the holder 42, and armature coils 44a, 44b, and 44c molded and partially embedded in the body 43. The armature coils 44a, 44b, and 44c are disposed in a non-overlapping manner at an even pitch angle of 60° about the shaft 41 within a 180° angular area.

A flat sector-shaped rotor provides a good weight unbalance and the vibrator motor disclosed in U.S. Pat. No. 5,036,239 has favorably been accepted in the market. However, the market always demands a smaller portable alerting device, and this trend requires even more compact vibrator motor having sufficient torque and weight unbalance of the rotor.

SUMMARY OF THE INVENTION

It is therefore a primary object of the present invention to provide a compact flat coreless vibrator motor that provides sufficient torque and an improved weight unbalance of the rotor.

In order to achieve the above object, a flat coreless vibrator motor of the present invention employs a generally sector-shaped rotor that has a body consisting of a first part and a second part made of a first synthetic resin and a second synthetic resin, respectively, the second part being disposed generally radially outside of the first part, and the second synthetic resin having a density that is substantially greater than a density of the second synthetic resin.

More specifically, the vibrator motor of the present invention has a flat-profile generally cylindrical case, a shaft supported by the case, a ring-shaped permanent field magnet disposed in the case coaxially with the shaft, and a flat generally sector-shaped coreless armature rotor disposed in the case and mounted on the shaft.

The rotor has a body that comprises a first part made of a first synthetic resin having a first density, which is less than 1.8, and a second part made of a second synthetic resin having a second density, which is greater than 5.0. The second part is disposed generally radially outside of the first part. The first synthetic resin and the second synthetic resin are bonded to each other at the boundary thereof. The rotor has a plurality of armature coils molded and partially embedded in the first part of the body and disposed at a predetermined pitch angle within a total angular area of 180° about the shaft in non-overlapping relationship with one another.

The armature rotor includes a ring-shaped commutator disposed coaxially with the shaft. The commutator has a plurality of arcuate segments arranged at an even angular pitch about the shaft. The motor further has a pair of resilient commutator brushes of opposite polarities disposed in the case in contact with the commutator.

In the second embodiment of the present invention, at least a portion of the second part of the body of the rotor is interposed between the field magnet and a cylindrical side plate of the case.

In the third embodiment of the present invention, the shaft is fixedly supported by the case and the rotor is rotatably mounted on the shaft in a manner that the first part of the body thereof is in a direct sliding contact with the shaft without bearings or a center holder. The first part of the rotor body has, integrally on its top, at least one circular convexity coaxial with the shaft. The motor has a ring washer having an inside surface that is in a plane orthogonal to the longitudinal center axis of the shaft. The ring washer is disposed coaxially with the shaft in a manner that at least a portion of the ring washer is interposed between a top internal surface of the case and the circular convexity so that the circular convexity slides on an inside surface of the ring washer. In this third embodiment, the pair of resilient commutator brushes urge the rotor towards the ring washer so that the circular convexity is pressed against the inside surface of the ring washer.

DETAILED DESCRIPTION OF THE PREFERRED EMBODIMENTS

The invention will now be described in detail with reference to the drawings.

Figure 1:
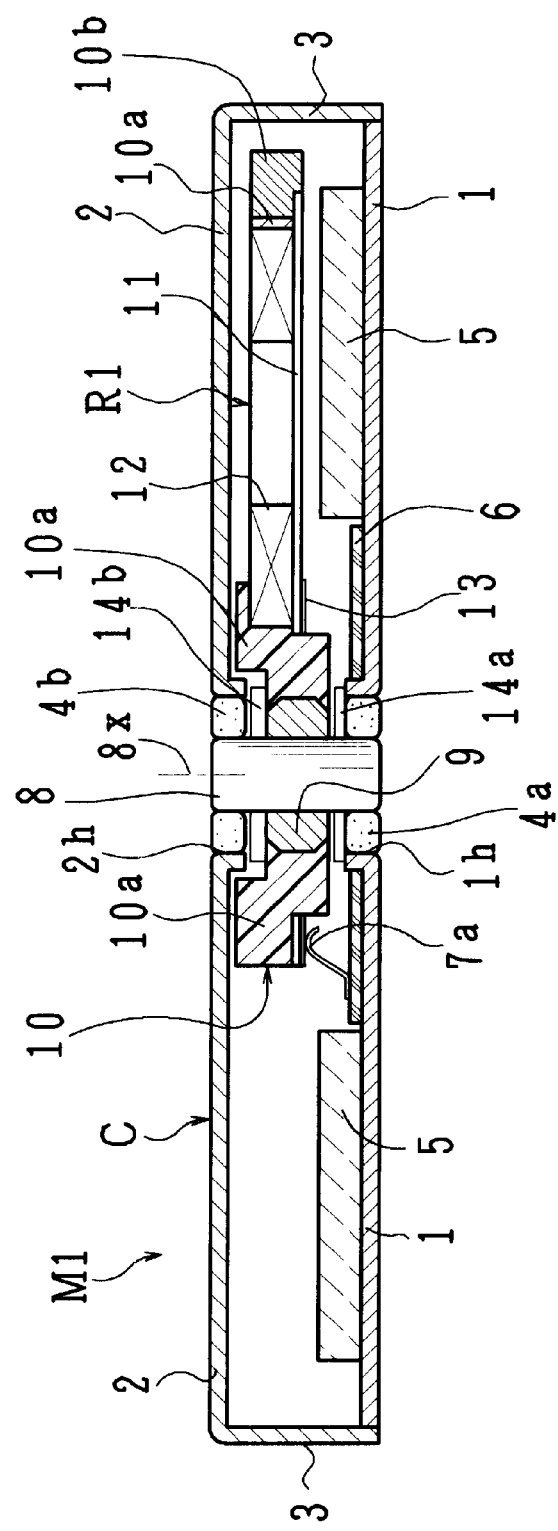
FIG. 1 is a cross-sectional view of a flat coreless vibrator motor of the first embodiment according to the present invention along the longitudinal center axis of the shaft thereof.

Referring to FIG. 1, the vibrator motor M1 of the first embodiment according to the present invention has a generally flat cylindrically-shaped case C consisting of a disc-shaped base plate 1 having its center hole 1$h$, a disc-shaped top plate 2 having its center hole 2$h$, and a cylindrical side plate 3 extending integrally downward from the outer periphery of the top plate 2. A bottom open end of the side plate 3 is securely fixed to a circular periphery of the base plate 1. A pair of lubricant-containing bearings 4$a$ and 4$b$ are securely fitted in the center holes 1$h$ and 2$h$, respectively. A shaft 8, having a longitudinal center axis (i.e. rotational axis) 8$x$ is rotatably supported by the case C with the bearings 4$a$ and 4$b$.

Figure 3A:
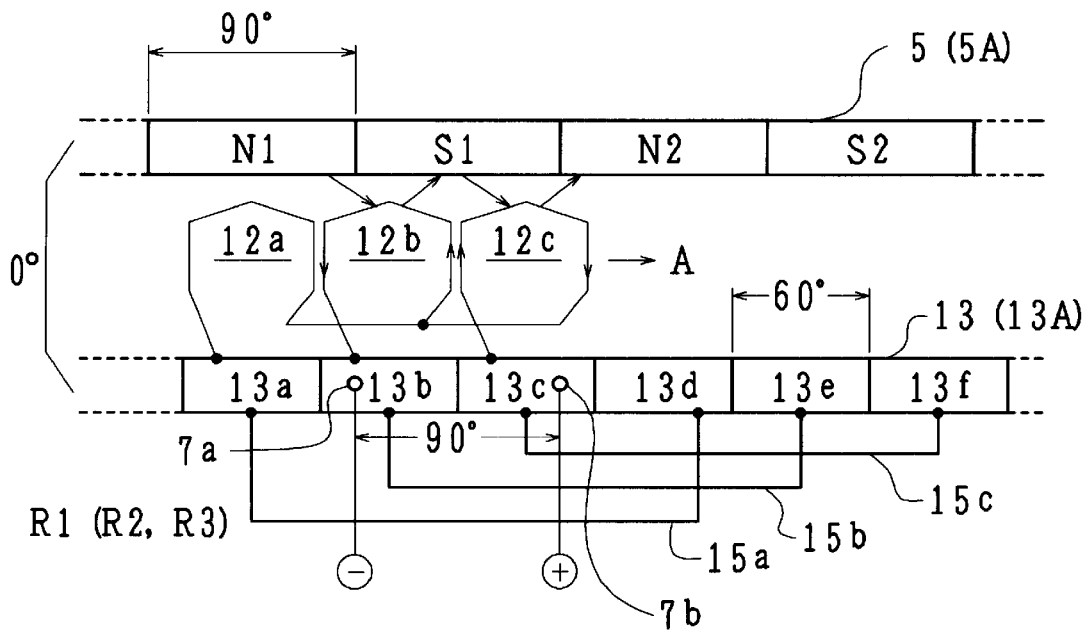
FIGS. 3A and 3B are semi-diagrammatic developed views with electrical wiring of substantial parts of the vibrator motor shown in FIG. 1.

Referring to FIGS. 1 and 3A, a ring-shaped permanent field magnet 5 made of a rare earth element is disposed in the case C and is fixedly mounted on an inside surface of the base plate 1 coaxially with the center axis 8$x$. An electrically-insulated brush base 6 is fixedly mounted on the inside surface of the base plate 1 radially inside of the magnet 5. A pair of resilient commutator brushes 7$a$ and 7$b$ of opposite polarities are mounted on the brush base 6. (As will be explained later, since the brushes 7$a$ and 7$b$ are disposed in a manner that their contact points with a commutator are mutually positioned at an angle of 90° about the center axis 8$x$, the second brush 7$b$ is not in view in FIG. 1 but is shown in FIG. 3A.)

Figure 2:
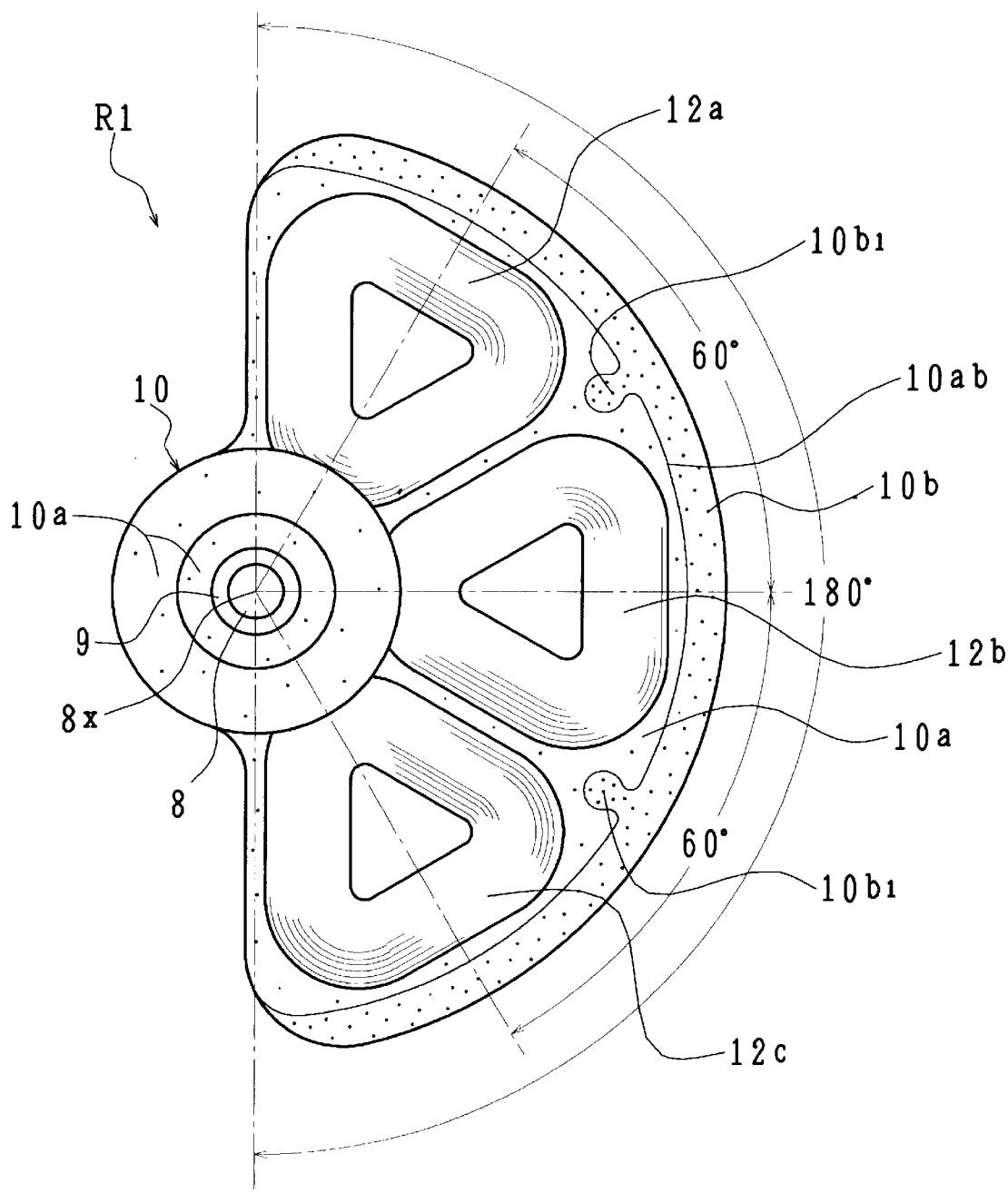
FIG. 2 is a plan view of a rotor employed in the vibrator motor shown in FIG. 1.

Referring to FIGS. 1 and 2, the vibrator motor M1 has a flat generally sector-shaped rotor R1. The rotor R1 has a brass-made toroidal center holder 9 fixedly fitted on the shaft 8, a body 10 made of synthetic resin, fixedly attached to the holder 9, an insulated supporting base plate 11 fixedly attached to the body 10, armature coils 12$a$, 12$b$, and 12$c$ (generally designated as 12), and a flat ring-shaped commutator 13 fixedly attached to a bottom surface of the base plate 11 coaxially with the center axis 8$x$.

A slide washer 14$a$ is disposed between the bearing 4$a$ and the center holder 9 and another slide washer 14$b$ is disposed between the bearing 4$b$ and the holder 9.

The body 10 of the rotor R1 consists of a first part 10$a$ and a second part 10$b$. The first part 10$a$ is disposed generally radially inside of the second part 10$b$ and is securely attached to the center holder 9.

The armature coils 12$a$, 12$b$ and 12$c$ are fixedly disposed on the base plate 11 in a manner that the coils 12$a$, 12$b$ and 12$c$ are angularly arranged at an even pitch angle of 60° and molded and partially embedded in the first part 10$a$ of the body 10 in a non-overlapping manner within an angular range of 180° about the center axis 8$x$.

The second part 10$b$ has generally an arcuate form and is disposed radially outside of the coils 12$a$, 12$b$ and 12$c$ and a radially outermost end part of the rotor R1. Although most of the second part 10$b$ is disposed radially outside of the first part 10$a$, the second part 10$b$ has a pair of bulged portions 10$b$1 that radially inwardly protrude into the first part 10$a$ so that the first part 10$a$ and the second part 10$b$ are interlocked with each other by the bulged portions 10$b$1. Although the first part 10$a$ and the second part 10$b$ are bonded to each other at their boundary 10$ab$, this interlocking connection between the first and the second parts 10$a$, 10$b$ doubly prevents a separation of the second part 10$b$ from the first part 10$a$ due to a centrifugal force during the rotation of the rotor R1.

In this embodiment, the first part 10$a$ is made of a synthetic resin having a density of about 1.4 and the second part 10$b$ is made of a synthetic resin having a density of about 12.0. More specifically, the second part 10$b$ is made of a high-density hybrid engineering plastic material such as tungsten powder bound with polyamides. Alternatively, the first part 10$a$ may be made of a synthetic resin having a density less than 1.8 and the second part 10$b$ may be made of a synthetic resin having a density greater than 5.0.

Figure 3B:
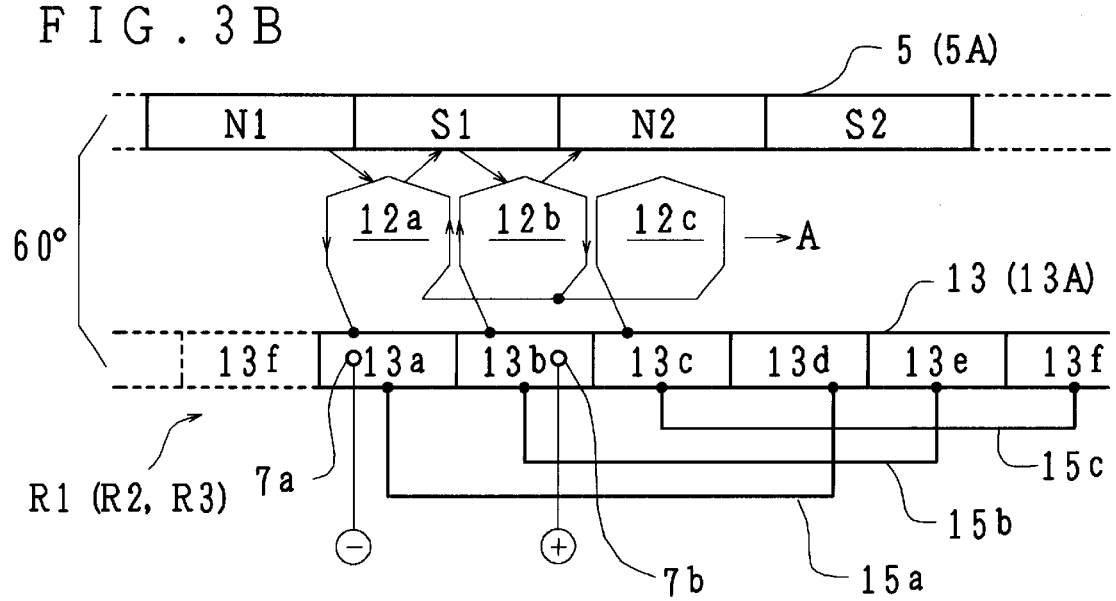

FIGS. 3A and 3B are semi-diagrammatic developed views explanatory of the positional arrangements and/or electrical connections among the field magnet 5, the armature coils 12, the commutator 13, and the commutator brushes 7$a$, 7$b$.

Referring to FIGS. 1 and 3A, the magnet 5 is divided into four arcuate alternate north and south pole sections, N1, S1, N2 and S2, which are disposed coaxially with the center axis 8$x$ at an even pitch angle of 90°. Although the magnet 5 in the present embodiment is integrally constructed, each pole section thereof may be of a separate segment.

The ring-like commutator 13 has six angularly evenly divided arcuate segments 13$a$, 13$b$, 13$c$, 13$d$, 13$e$ and 13$f$ disposed at an even pitch angle of 60° about the center axis 8$x$. The resilient comutator brushes 7$a$ and 7$b$ are in contact with the commutator 13 in a manner that their contact points with the commutator 13 are positioned at 90° to each other about the center axis 8$x$. The three diametrically opposing pairs of the commutator segments 13$a$–13$d$, 13$b$–13$e$ and 13$c$–13$f$ are individually short-circuited with each other by the connecting conductors 15$a$, 15$b$, and 15$c$, respectively.

Referring to FIGS. 1, 2 and 3A, one end of each of the armature coils 12$a$, 12$b$ and 12$c$ are electrically connected to one another and the other end of each of the armature coils 12$a$, 12$b$ and 12$c$ are electrically connected to the commutator segments 13$a$, 13$b$ and 13$c$, respectively, so that the armature coils 12$a$, 12$b$ and 12$b$ form a star (or, "Y") connection as shown in FIG. 3A. Although not shown, the connection of the armature coils 12 may alternatively be made in a delta connection.

Referring to FIG. 3A, when the motor M1 is energized with the dc power in the polarity shown, electric currents flow through the armature coils 12$b$ and 12$c$ in the directions indicated by the respective arrows. Then, the armature coils 12$b$ and 12$c$ are magnetized in north and south polarities, respectively. Then, the coil 12$b$ is repelled by the field magnet section N1 and attracted by the section S1. Simultaneously, the coil 12$c$ is repelled by the field magnet section S1 and attracted by the section N2. Consequently, a torque is produced in the rotor R1 in the direction indicated by arrow A.

In FIG. 3A, it is assumed that the rotor R1 has a current angular position of 0° with respect to the field magnet 5, which is stationary. In FIG. 3B, it is assumed that the rotor R1 has rotated by 60° from the angular position shown in FIG. 3A. In FIG. 3B, electric currents will flow through the armature coils 12a and 12b in the directions indicated by the respective arrows, and the coils 12a and 12b will be magnetized in north and south polarities, respectively. The coil 12a will, therefore, be repelled by the magnet section N1 and attracted by the section S1. Simultaneously, the coil 12b will be repelled by the magnet section S1 and attracted by the section N2. Accordingly, the torque produced in the rotor R1 will still be in the same direction indicated by arrow A. As the rotor R1 turns further, two armature coils out of the three will similarly be energized and the torque in the rotor R1 will be produced in a cyclic manner always in the same direction regardless of a current angular position of the rotor R1. The rotor R1, therefore, will maintain its rotation in the same direction as long as the dc power is supplied. Such principle of the rotation of the rotor R1 is a prior known art and is not a novel element in the present invention.

Figure 4:
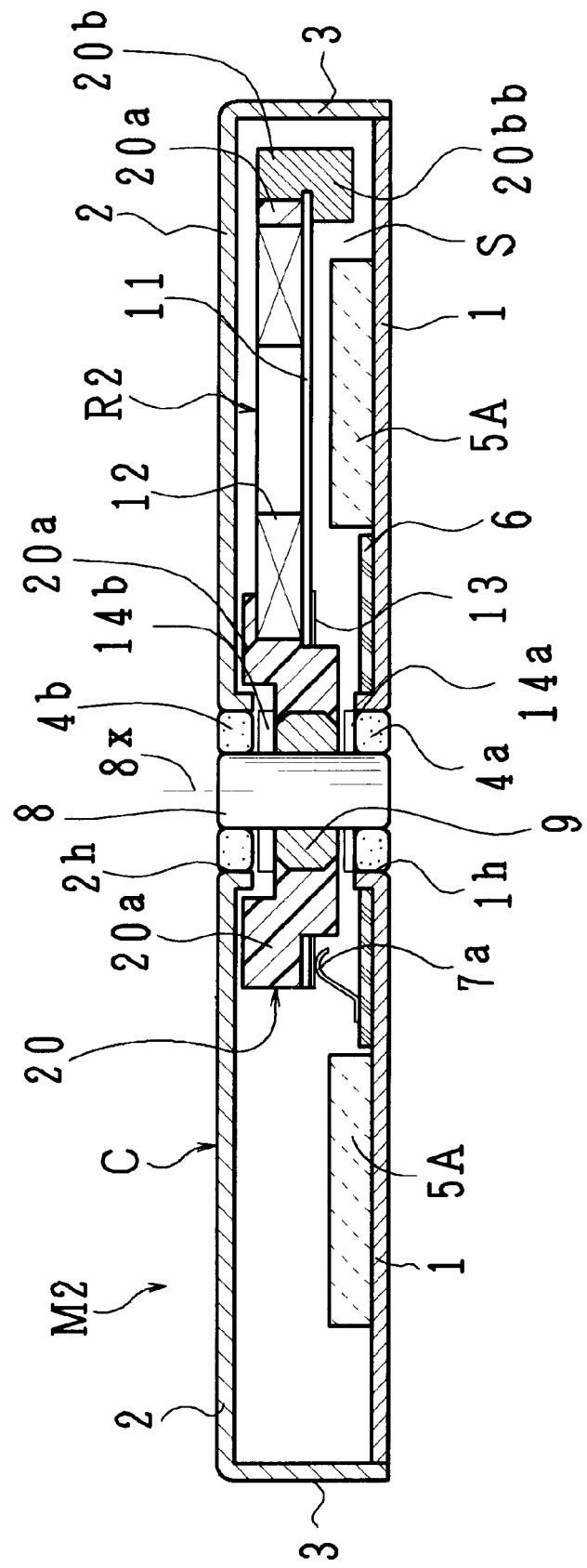
FIG. 4 is a cross-sectional view of a flat coreless vibrator motor of the second embodiment according to the present invention along the longitudinal center axis of the shaft thereof.
Figure 5:
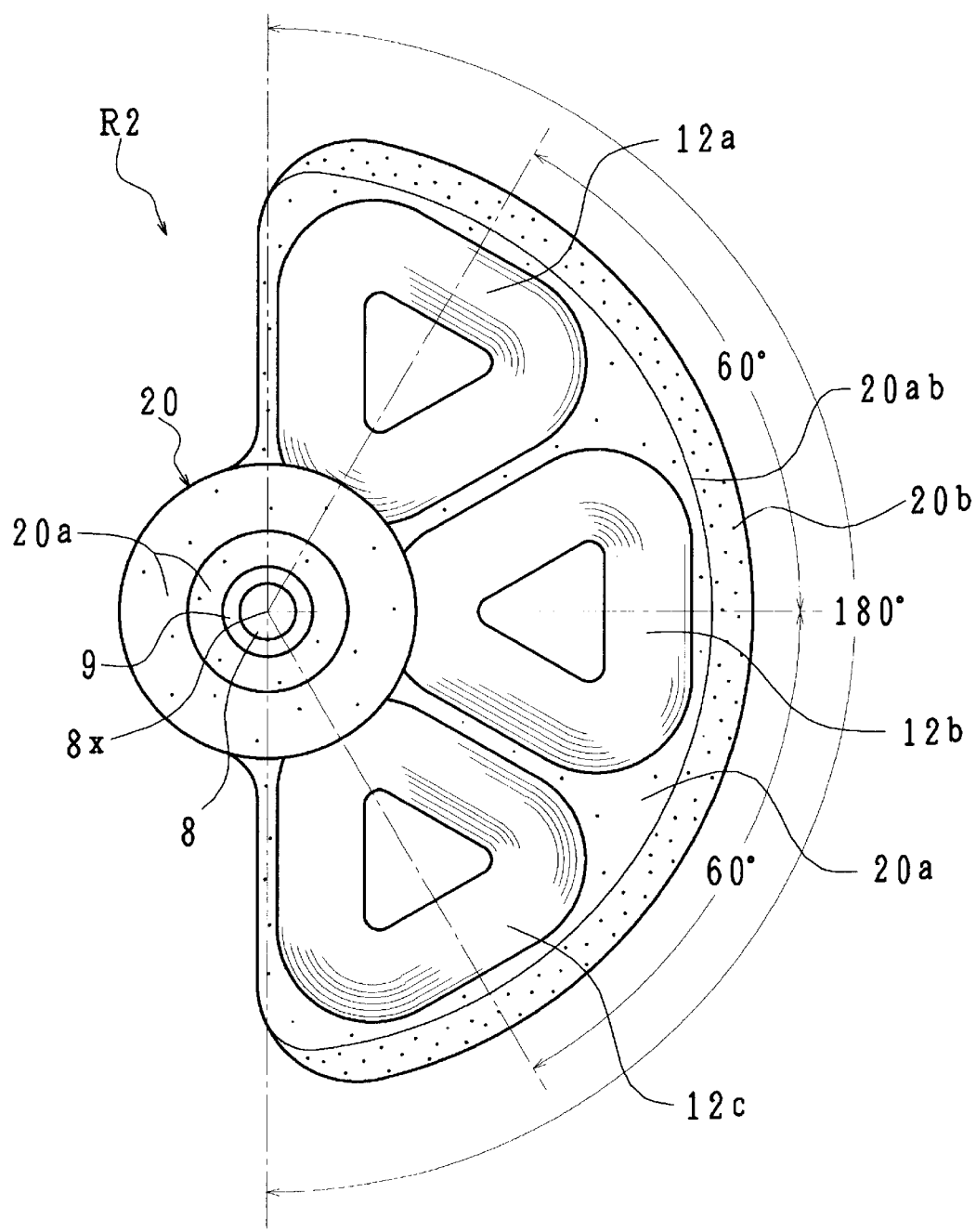
FIG. 5 is a plan view of a rotor employed in the vibrator motor shown in FIG. 4.

FIG. 4 is a cross-sectional view of a flat coreless vibrator motor M2 of the second embodiment according to the present invention along the longitudinal center axis 8x of the shaft 8 thereof and FIG. 5 is a plan view of a flat generally sector-shaped rotor R2 employed in the vibrator motor M2 shown in FIG. 4. The basic construction and the functional principle of the vibrator motor M2 are similar to those of the vibrator motor M1 of the first embodiment.

Unless otherwise specifically described, it should be understood, throughout this specification, that like reference numerals or characters denote like components or parts, structurally and functionally. Therefore, no duplicate explanation may be made on the components or parts with reference numerals or characters that are already explained above.

The vibrator motor M2 is physically different from motor M1 only in its field magnet and a body of its rotor R2. The motor M2 has a ring-like field magnet 5A whose outside diameter is smaller than that of the magnet 5 of motor M1. There is, therefore, an extra space S in the case C between its side plate 3 and the field magnet 5A.

The rotor R2 of the motor M2 has a body 20 made of synthetic resin that has a first part 20a and a second part 20b. The first part 20a is disposed generally radially inside of the second part 10b and is securely attached to the center holder 9. The second part 20b has generally an arcuate form and is disposed generally radially outside of the coils 12a, 12b and 12c and at a radially outermost end part of the rotor R2.

The second part 20b has a bottom part 20bb that extends down to a level below the levels of the coils 12 and the base plate 11 so that at least a portion of the bottom part 20bb is disposed in the space S between the cylindrical side plate 3 of the case C and the field magnet 5A, as shown in FIG. 4. The synthetic resin materials of the first part 20a and the second part 20b are exactly the same as those of the first part 10a and the second part 10b, respectively, of the rotor R1 of the motor M1, as described above, and the first part 20a and the second part 20b are securely bonded to each other at their boundary 20ab. The bottom part 20bb is an extra weight for the second part 20b and the bottom part 20bb causes the center of mass of the rotor R2 to shift further away from the center axis 8x as compared with the position of the center of mass of the rotor R1 of the motor M1. Such additional shifting of the center of mass away from the rotational axis 8x enhances vibratory characteristics of the rotor R2.

Figure 6:
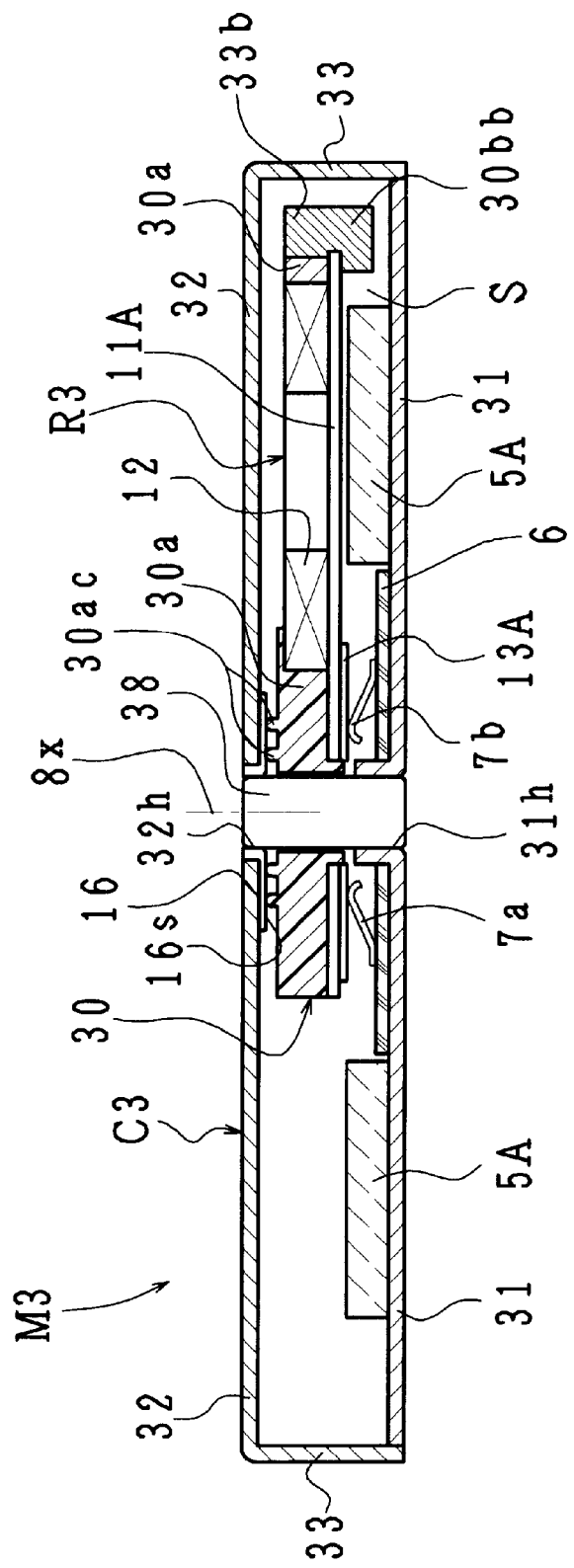
FIG. 6 is a cross-sectional view of a flat coreless vibrator motor of the third embodiment according to the present invention along the longitudinal center axis of the shaft thereof.
Figure 7:
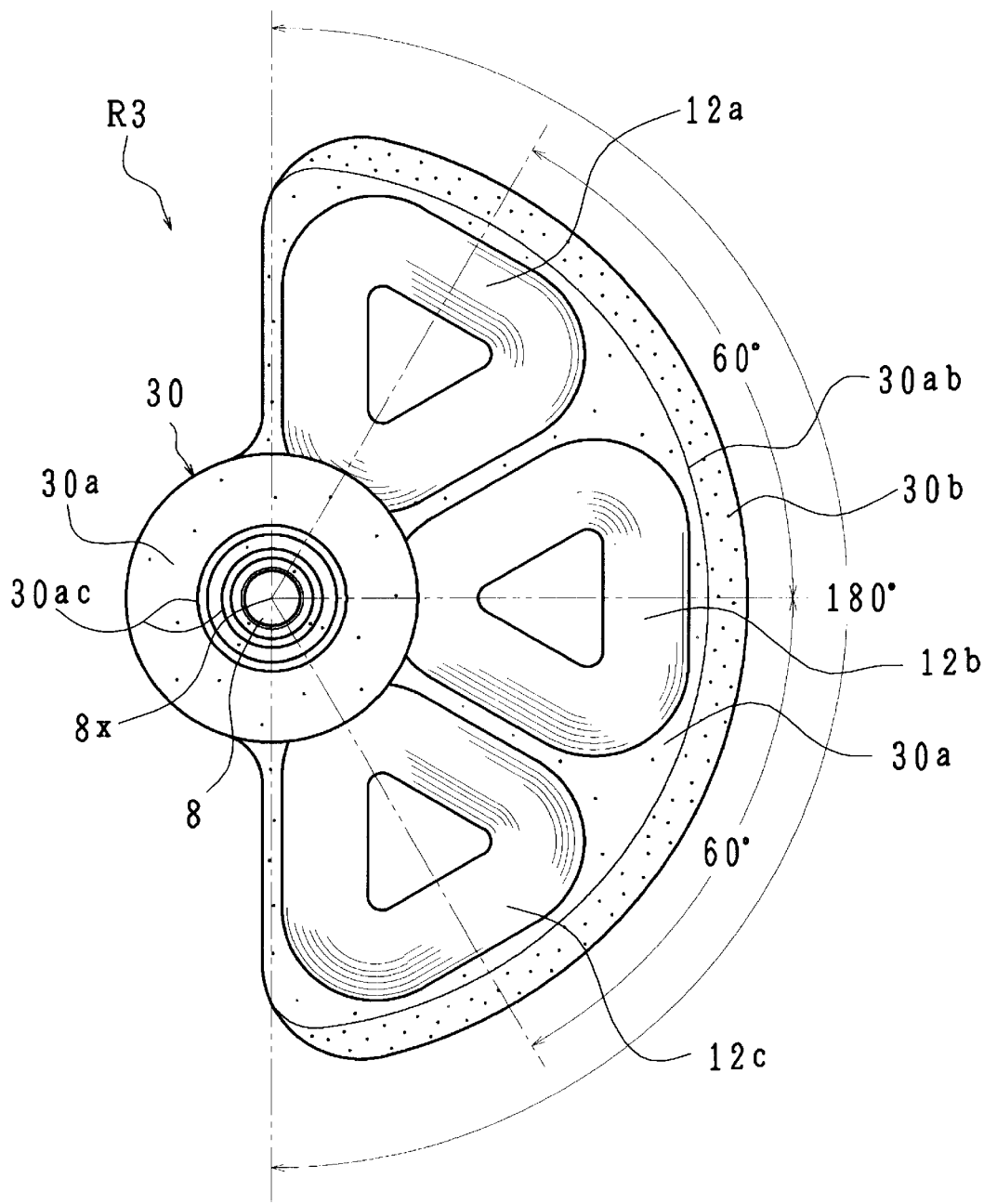
FIG. 7 a plan view of a rotor employed in the vibrator motor shown in FIG. 6.
Figure 8:
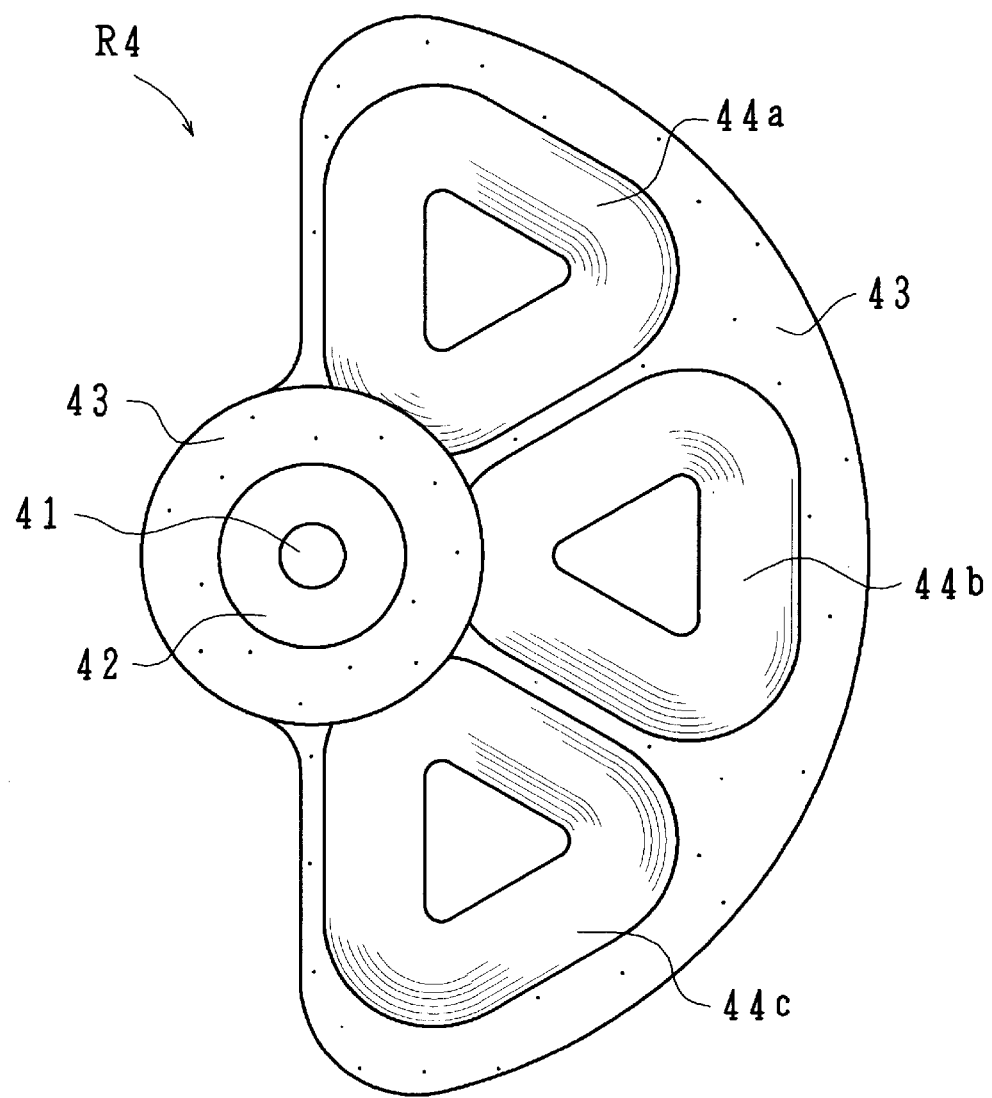
FIG. 8 is a plan view of a rotor that is employed in a conventional flat coreless vibrator motor.

FIG. 6 is a cross-sectional view of a flat coreless vibrator motor M3 of the third embodiment according to the present invention along the longitudinal center axis 8x of a shaft 38 thereof and FIG. 7 is a plan view of a flat generally sector-shaped rotor R3 employed in the vibrator motor M3 shown in FIG. 6.

In FIGS. 6 and 7, the brush base 6, the commutator brushes 7a, 7b, the armature coils 12 and the field magnet 5A are substantially the same as the corresponding components or parts shown in FIGS. 4 and 5, physically and functionally.

The motor M3 has a generally flat cylindrically-shaped case C3 comprising a disc-shaped base plate 31 having its center hole 31h, a disc-shaped top plate 32 having its center hole 32h, and a cylindrical side plate 33 extending integrally downward from the outer periphery of the top plate 32. A bottom open end of the side plate 33 is securely fixed to a circular periphery of the base plate 31. A ring washer 16 having a bottom surface 16s is securely fitted in the center hole 32h. A shaft 38, having its longitudinal center axis 8x, is fixedly supported by the case C3 in a manner that a bottom end thereof is securely fitted in the center hole 31h and a top end thereof is securely fitted in the ring washer 16.

The rotor R3 has a body 30 made of synthetic resin, an insulated supporting base plate 11A fixedly attached to the body 30, armature coils 12a, 12b, and 12c (generally designated as 12) fixedly attached onto the base plate 11A, and a flat ring-shaped commutator 13A fixedly attached to a bottom surface of the base plate 11A coaxially with the center axis 8x.

The body 30 consists of a first part 30a and a second part 30b. The first part 30a is disposed generally radially inside of the second part 30b. The second part 30b has generally an arcuate form and is disposed radially outside of the coils 12a, 12b and 12c and at a radially outermost end part of the rotor R3. The first part 10a and the second part 10b are bonded to each other at their boundary 30ab.

The rotor R3 is rotatably and directly mounted on the shaft 38 in a manner that a first part 30a of the body 30 is in a direct sliding contact with the shaft 38 without bearings or a center holder. The first part 30a of the rotor body 30 has, integrally on its top, a pair of concentric circular convexities 30ac coaxial with the center axis 8x. In alternate embodiments, the number of the circular convexities may be changed to any number of one or more. The inside surface 16s of the ring washer 16 is in a plane orthogonal to the center axis 8x. The ring washer 16 is disposed coaxially with the shaft 38 in a manner that at least a portion of the ring washer 16, having the inside surface 16s, is interposed between an internal surface of the top plate 32 of the case C3 and the circular convexities 30ac so that the circular convexities 30ac slide on an inside surface 16s of the ring washer 16. The pair of resilient commutator brushes 7a and 7b of opposite polarities are mounted on the brush base 6 and are in contact with the commutator 13A. As opposed to FIGS. 1 and 4, both the commntator brushes 7a, 7b are depicted in FIG. 6 on the assumption that the contact point with the commutator 13A of each brush is located at an angle of 45° on each side (as viewed in FIG. 6) of the center axis 8x, thus the two contact points being angularly apart from each other by 90°. The brushes 37a, 37b urge the rotor R3 toward the ring washer 16 so that the circular convexities 30ac are pressed against the inside surface 16s of the ring washer 16.

As in the case of the rotor R2, the second part 30b of the rotor R3 has a bottom part 30bb that extends down to a level below the levels of the coils 12 and the base plate 11A in a manner that at least a portion of the bottom part 30bb is disposed in the space S between the cylindrical side plate 33 of the case C3 and the field magnet 5A. The synthetic resin materials of the first part 30a and the second part 30b are exactly the same as those of the first part 10a and the second part 10b, respectively, of the rotor R1 of the motor M1, as described above, and the first part 30a and the second part 30b are securely bonded to each other at their boundary 30ab.

The armature coils 12 of both the rotors R2 and R3 are attached onto the respective base plates 11A, molded and partially embedded in the first parts 20a and 30a, respectively, and disposed in exactly the same angular positions about the respective center axes 8x as in the case of the rotor R1.

Since the electromagnetic principle for the rotation of the rotors R2 and R3 of the vibrator motors M2 and M3, respectively, are exactly the same as that of the rotor R1 of the motor M1, as described above in reference to FIGS. 3A and 3B, no duplicate explanation will be made on the principle of the rotation of the rotors R2 and R3.

Since the vibrator motor of the present invention employs a sector-shaped rotor having substantially increased weight in is radially outermost section with little addition to their radial dimension, their weight off-balance characteristics is greatly improved without adding its dimensions. Furthermore, since the motor has neither external eccentric weight nor output shaft, the alerting device employing this motor can be designed compact, and there is no danger of interference between a rotating eccentric weight and any other parts contained in the alerting device.

It will be understood that various changes and modifications may be made in the above described embodiments which provide the characteristics of the present invention without departing from the spirit and principle thereof particularly as defined in the following claims.

What is claimed is:

1. A flat coreless vibrator motor, comprising:
   (a) a case;
   (b) a shaft supported by said case, said shaft having a longitudinal center axis;
   (c) a ring-shaped permanent field magnet disposed inside said case coaxially with said center axis, said field magnet having alternate north and south magnetic poles arranged at an even angular pitch;
   (d) a generally sector-shaped coreless armature rotor disposed in said case and mounted on said shaft, said rotor having a body that comprises a first part made of a first synthetic resin having a first density and a second part made of a second synthetic resin having a second density, said second density being greater than said first density, said first part being disposed generally radially inside of said second part, said rotor having a plurality of armature coils molded in said body and arranged at a predetermined pitch angle in non-overlapping relationship with one another, said armature rotor including a commutator disposed coaxially with said center axis, said commutator having segments arranged at an even angular pitch about said center axis; and
   (e) a pair of resilient commutator brushes of opposite polarities disposed in said case in contact with said commutator.

2. A flat coreless vibrator motor according to claim 1, wherein said first density of said first synthetic resin is less than 1.8 and said second density of said second synthetic resin is greater than 5.0.

3. A flat coreless vibrator motor according to claim 1, wherein said first part and said second part are bonded to each other and at least a portion of said second part is interlocked with said second part.

4. A flat coreless vibrator motor according to claim 1, wherein said case has a cylindrical side plate and at least a portion of said second part of said body of said rotor is interposed between said field magnet and said side plate.

5. A flat coreless vibrator motor according to claim 1, wherein said armature coils are disposed within an angular range of 180° about said center axis.

6. A flat coreless vibrator motor, comprising:
   (a) a case having a cylindrical inside side wall;
   (b) a shaft supported by said case, said shaft having a longitudinal center axis;
   (c) a ring-shaped permanent field magnet disposed inside said case coaxially with said center axis, said field magnet having alternate north and south magnetic poles arranged at an even angular pitch;
   (d) a generally sector-shaped coreless armature rotor disposed in said case, said rotor having a body that comprises a first part made of a first synthetic resin having a first density and a second part made of a second synthetic resin having a second density, said second density being greater than said first density, said first part being disposed generally radially inside of said second part, said rotor having a plurality of armature coils molded in said body and arranged at a predetermined pitch angle in non-overlapping relationship with one another, said armature rotor including a commutator disposed coaxially with said center axis, said commutator having segments arranged at an even angular pitch about said center axis, said rotor being rotatably mounted on said shaft in a manner that said first part of said body is directly in contact with said shaft, said first part of said body having, integrally on top thereof, a circular convexity coaxial with said center axis;
   (e) a ring washer disposed coaxially with said center axis in a manner that at least a portion of said ring washer being interposed between said case and said circular convexity, said ring washer having an inside surface that is in a plane orthogonal to said center axis, said circular convexity being slidably in contact with said inside surface of said ring washer; and
   (f) a pair of resilient commutator brushes of opposite polarities disposed in said case in contact with said commutator in a manner that said brushes urge said rotor toward said ring washer.

7. A flat coreless vibrator motor according to claim 6, wherein said first density of said first synthetic resin is less than 1.8 and said second density of said second synthetic resin is greater than 5.0.

8. A flat coreless vibrator motor according to claim 6, wherein said case has a cylindrical side plate and at least a portion of said second part of said body of said armature rotor is interposed between said field magnet and said side plate.

9. A flat coreless vibrator motor according to claim 6, wherein said armature coils are disposed within an angular range of 180° about said center axis.

* * * * *